US008224505B2

(12) United States Patent
Botargues et al.

(10) Patent No.: US 8,224,505 B2
(45) Date of Patent: Jul. 17, 2012

(54) METHOD AND DEVICE FOR DETERMINING AND UPDATING A TARGET ALTITUDE FOR AN EMERGENCY DESCENT OF AN AIRCRAFT

(75) Inventors: Paule Botargues, Toulousse (FR); Erwin Grandperret, Blagnac (FR); Lucas Burel, Blagnac (FR)

(73) Assignee: Airbus Operations (SAS), Toulouse Cedex (FR)

( * ) Notice: Subject to any disclaimer, the term of this patent is extended or adjusted under 35 U.S.C. 154(b) by 0 days.

(21) Appl. No.: 13/184,040

(22) Filed: Jul. 15, 2011

(65) Prior Publication Data

US 2012/0022723 A1 Jan. 26, 2012

(30) Foreign Application Priority Data

Jul. 20, 2010 (FR) ...................................... 10 55891

(51) Int. Cl.
*G05D 1/00* (2006.01)
(52) U.S. Cl. ......... 701/4; 701/3; 701/5; 701/11; 701/14; 244/180; 244/181; 244/190; 244/76 R; 340/947; 340/970; 342/33; 342/462
(58) Field of Classification Search .................. 701/4, 5, 701/8, 3, 11, 14, 16; 244/180, 181, 190, 244/76 R; 340/947, 970
See application file for complete search history.

(56) References Cited

U.S. PATENT DOCUMENTS

| 4,314,341 | A | 2/1982 | Kivela | |
|---|---|---|---|---|
| 6,507,776 | B1 * | 1/2003 | Fox, III | ............................ 701/11 |
| 2007/0043482 | A1 * | 2/2007 | Aimar | ............................... 701/4 |
| 2009/0228161 | A1 | 9/2009 | Botargues et al. | |
| 2010/0004801 | A1 | 1/2010 | Flotte et al. | |
| 2010/0168936 | A1 * | 7/2010 | Caillaud et al. | .................... 701/5 |

FOREIGN PATENT DOCUMENTS

| FR | 2906921 | 4/2008 |
|---|---|---|
| FR | 2928465 | 9/2009 |
| FR | 2932895 | 12/2009 |
| FR | 2939883 | 6/2010 |

OTHER PUBLICATIONS

French Patent Office, International Search Report FR 1055891 (2 pgs.), Feb. 17, 2011.

* cited by examiner

*Primary Examiner* — Redhwan K Mawari
(74) *Attorney, Agent, or Firm* — Wood Herron & Evans LLP

(57) ABSTRACT

A method and device are provided for determining a target altitude for an emergency descent of an aircraft that is to be reached by the end of the emergency descent. The method includes determining an initial target altitude representative of the initial position of the aircraft and then repeatedly determining a current target altitude along a reference horizontal distance. The current target altitude is compared to the initial target altitude and is used to update the emergency descent if the current target altitude is lower than the initial target altitude. Each target altitude is selected as the larger of a predetermined threshold altitude and a security altitude that ensures any obstructions along a remaining horizontal distance are avoided.

11 Claims, 3 Drawing Sheets

METHOD AND DEVICE FOR DETERMINING AND UPDATING A TARGET ALTITUDE FOR AN EMERGENCY DESCENT OF AN AIRCRAFT

TECHNICAL FIELD

The present invention relates to a method and a device for determining and updating a target altitude for an emergency descent of an aircraft, in particular a transport airplane.

BACKGROUND

As known, civil transport airplanes should be pressurized, as upon a cruise flight, an airplane flies at an altitude being often higher than 30,000 feet (about 9,000 meters), for which the external air is too low in oxygen (and also too cold and too dry) for being compatible with life. Thus, pressurizing systems are provided in airplanes for keeping on board a breathable atmosphere. In particular, the international aeronautic regulation states that any public transport airplane flying at an altitude higher than 20,000 feet (about 6,000 meters) should be pressurized and that it should establish in the cockpit an equivalent altitude which does not exceed 8,000 feet (about 2,400 meters) upon a normal flight.

It may however occur that, as a result of a breakdown or an incident, the pressurization in the airplane could no longer be maintained at an acceptable level. A regulatory procedure then compels the pilot to have the airplane descent, as quickly as possible, at a breathable altitude of 10,000 feet (about 3,000 meters) or at the current security altitude if it is not possible to descent as low as 10,000 feet because of the relief. Such a procedure is referred to as an emergency descent.

In such a case, the crew is responsible for different tasks related to initiating the descent, as well as the adjustment of parameters of the descent (speed, target altitude, lateral trajectory, etc.) and this until the airplane flies level at low altitude.

It could happen, however, although very rarely, that the crew is no longer able to apply the above described procedure, for instance in the case of a pressurization breakdown as a result of which the crew have lost conscience. The airplane is, in such a case, unattended, while it is absolutely necessary to carry out an emergency descent. If, in such a situation, the autopilot is activated, the flight is continued automatically until the kerosene supplies are totally exhausted.

In order to avoid such a situation, an autopilot system is known, allowing, when it is engaged, to carry out the emergency descent automatically, that is without requiring the help of a pilot. Moreover, engaging such an automatic emergency descent could be carried out either manually by the pilot, or also automatically.

In particular, from document FR 2,928,465, a particular method is known for automatically controlling an emergency descent of an aircraft. According to this method, when an emergency descent automatic function is engaged, the following successive operations are carried out:

a) a set of vertical setpoints is automatically determined, comprising:
   a target altitude representing an altitude to be reached by the aircraft at the end of the emergency descent; and
   a target speed representing a speed that the aircraft should respect upon the emergency descent;

b) a set of lateral setpoints is automatically determined, representing a lateral maneuver to be carried out upon the emergency descent; and c) the aircraft is automatically guided so that it simultaneously respects said set of vertical setpoints and said set of lateral setpoints until reaching said target altitude that it subsequently maintains, said automatic guidance being able to be interrupted by an action of the pilot of the aircraft.

Furthermore, this known method provides particular means for automatically engaging the emergency descent function, taking into account the variation of altitude of the cockpit, that is the variation of pressure inside the cockpit.

As far as the determination of a target altitude is concerned within the context of an automated emergency descent, the following is known:

from document U.S. Pat. No. 4,314,341, an automated emergency descent to a security altitude, the value of which is inclusively fixed to 2000 feet (about 3600 m). Such a value corresponds to a physiologically breathable and satisfactory altitude, but it could be lower at the highest grounds (Alpes, Himalayas, Andes, Rocky Mountains, etc.). Thus, it is not satisfactory to ensure a secured end of maneuver, should a crew be unconscious (possible collision with the ground);

from U.S. Pat. No. 6,507,776, a coupling between an autopilot and a GPS system having a data base wherein values of altitude are stored for all the reliefs, having the altitude higher than or equal to a fixed maximum value. Such a GPS system is provided with a device for identifying the relief along the current trajectory. Such a device allows the autopilot to be provided with the lowest possible security target altitude, available by adjusting the heading of the aircraft if needed, for bypassing the ground. Such a device has the drawback of directing the aircraft outside the area covered by the initially followed air traffic lane. The associated risk involves increasing the workload of the crew when they are conscious again, as the aircraft is likely to fly far from the initially followed flight itinerary, and, moreover, not to have enough kerosene available for reaching the closest deviating airport, from document US 2007/0,043,482, another device integrated into an autopilot able to carry out automatically an emergency descent to a security altitude, the calculation thereof being based on security minimum altitudes of the MSA type (<<Minimum Safe Altitude>>). More precisely, a data base containing the MSA altitudes is used for determining the associated security altitude, either at the current flight itinerary, or, should it exist, at a deviation trajectory provided by the airline company. When the airplane is outside the flight itinerary or outside a deviation lane, the security altitude is calculated from the data base of the ground, taking as a value, the maximum altitude on a trajectory maintaining the current heading. Such a device taking into consideration the surrounding relief has the drawback of targeting a potentially too high and therefore, inappropriate altitude for allowing an unconscious crew to be able to keep the airplane under control again. Indeed, the risk involves hindering the descent strategy, selecting a security altitude corresponding to a point located much ahead the current trajectory of the airplane or the current flight itinerary, whereas a lower descent could be contemplated while leaving enough downstream margin, to adjust the deviation.

Consequently, none of such usual solutions is completely satisfactory, as none of them allow to provide, in all circumstances, an optimum target altitude value that, both, takes into account the surrounding relief for avoiding to descent the airplane at an altitude likely to cause a collision with the ground, and is the lowest possible to as to maximize the chances allowing a crew to keep the airplane under control again.

SUMMARY

The present invention aims at solving these drawbacks. It relates to a method for determining an optimum target altitude for an emergency descent of an aircraft, the target altitude representing the altitude to be reached by the aircraft at the end of the emergency descent.

To this end, according to this invention, said method is remarkable in that, from the activation of the emergency descent (that is the initiation or the engagement of the emergency descent, according to the embodiment being contemplated), and on a reference horizontal distance ahead of the aircraft with respect to an initial position of said aircraft at the activation of the emergency descent, the following operations are carried out, automatically and repeatedly:
 a remaining horizontal distance is determined, representing a horizontal distance that is still to be followed by the aircraft from its current position until a position located at said reference horizontal distance ahead of said initial position;
 a security altitude is determined being representative of said remaining horizontal distance;
 said security altitude is compared to a threshold altitude; and
 as the target altitude, the highest value is selected between said security altitude and said threshold altitude.

Thus, thanks to this invention, the target altitude is determined from a defined security altitude along the current trajectory of the aircraft at a certain distance (remaining horizontal distance) ahead of the aircraft, to be described below.

The method according to this invention therefore allows to take into account the relief along the current trajectory of the aircraft so as to avoid descending too low and causing a collision with the ground, while promoting the lowest possible descent, more particularly for allowing the occupants of the aircraft, should they become unconscious as a result of hypoxia, to regain conscience.

In a preferred embodiment, from the activation of the emergency descent:
 an initial target altitude is automatically determined being representative of said initial position of the aircraft at said activation of the emergency descent; and
 furthermore, the following operations are carried out, automatically and repeatedly, on said reference horizontal distance:
 the target altitude is compared (that has been determined as above described), referred to as the current target altitude, to said initial target altitude; and
 if said current target altitude is lower than said initial target altitude, the target altitude used upon the emergency descent is updated, taking into account said current target altitude.

Thus, thanks to this invention, the target altitude is updated in real time for allowing to bring the aircraft as low as possible while protecting from the relief. In particular, as described herein after, this allows for avoiding being hindered by a localized height of the relief:
 that has already been flown over upon the descent and thus corresponds to an obsolete data; or
 being located very far ahead of the aircraft and thus, to be ignored at short term.

The method according to this invention thereby allows to determine an optimized target altitude on said remaining horizontal distance located ahead the aircraft, maximizing the possibility to return to a nominal state in the case where an unconscious crew or passengers or victims of hypoxia symptoms, without reducing the security margins with respect to the relief along the trajectory to be followed.

It should be noticed that said reference horizontal distance corresponding to a maximum horizontal distance the aircraft is able to follow upon an emergency descent from the highest cruising flight level for the aircraft in a first simplified embodiment, it directly corresponds to such a maximum horizontal distance.

Moreover, in a second embodiment, said reference horizontal distance corresponding to the sum:
 of a maximum horizontal distance the aircraft is able to follow upon an emergency descent from the highest cruise flight level for the aircraft; and
 of a predetermined margin.

Such a margin allows taking into account:
 the fact that the distance to be followed upon a nominal emergency descent could be extended (for instance, after a decrease of the target speed as a result of structure damage); and
 the possibility that the crew would still be unconscious, once reaching the reference horizontal distance. Through such a margin, an additional period of time is therefore added, being sufficient for allowing the crew to regain conscience when the aircraft is stabilized at a given altitude.

In a preferred embodiment, said security altitude corresponds to the maximum altitude of the relief, preferably of the MORA type, along the trajectory of the aircraft on a predetermined distance ahead of the current position of the aircraft, and on a predetermined width on both sides of this trajectory, said trajectory being defined along the current flight itinerary or along the current heading of the aircraft.

The method according to this invention, such as mentioned hereinabove, for determining and updating an optimum target altitude for an emergency descent of an aircraft, is adapted to any type of emergency descent method, either partially or completely automated.

However, in a preferred application, such a method is used for determining and updating the target altitude in an automatic control method of an emergency descent of an aircraft, wherein the following successive operations are carried out:
 a) a set of vertical setpoints is automatically determined comprising:
 a target altitude representing an altitude to be reached by the aircraft at the end of the emergency descent; and
 a target speed representing a speed that the aircraft should respect upon the emergency descent;
 b) a set of lateral setpoints is automatically determined, representing a lateral maneuver to be carried out upon the emergency descent; and
 c) the aircraft is automatically guided so that it simultaneously respects said set of vertical setpoints and said set of lateral setpoints until reaching said target altitude.

Moreover, advantageously, when the aircraft reaches the target altitude and that the crew is still unconscious, the aircraft is automatically controlled so that it follows the ground, at an auxiliary altitude, and this as long as the crew have not regained. Preferably, this auxiliary altitude corresponds to the maximum value between a security altitude (representative of a horizontal distance to be described herein below) and a predetermined auxiliary threshold altitude.

Furthermore, advantageously, a resetting of said target altitude is further carried out, so as to take into account variations of barometric pressure occurring upon the emergency descent.

The present invention further relates to a device for automatically determining (and updating) a target altitude for an emergency descent of an aircraft, said target altitude representing the altitude to be reached by the aircraft at the end of the emergency descent.

According to this invention, such a device comprises at least the following means being active from the activation of the emergency descent (that is the initiation or the engagement of the emergency descent, according to the embodiment), and on a reference horizontal distance ahead of the aircraft (with respect to an initial position of said aircraft at the activation of the emergency descent):

- means for determining a remaining horizontal distance representing a horizontal distance that is still to be followed by the aircraft from its current position until a position located at said reference horizontal distance ahead of said initial position;
- means for determining a security altitude being representative of said remaining horizontal distance;
- means for comparing said security altitude to a threshold altitude; and
- means for selecting, as the target altitude, the highest value between said security altitude and said threshold altitude.

The present invention further relates to a method for automatically controlling an emergency descent of an aircraft, comprising a device of the above mentioned type for determining (and updating) automatically a target altitude upon such an emergency descent.

The present invention further relates to an aircraft, in particular a transport airplane, being provided with a device and/or a system such as mentioned hereinabove.

BRIEF DESCRIPTION OF THE DRAWINGS

The FIGS. of the appended drawing will better explain how this invention can be implemented. In these FIGS., like reference numerals relate to like components.

DETAILED DESCRIPTION

Figure 1:
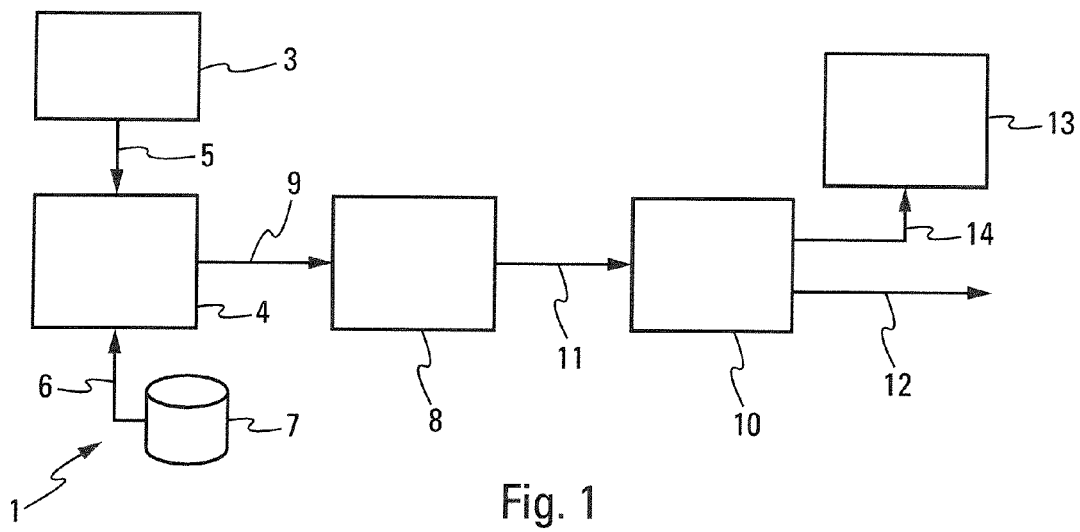
FIG. 1 schematically illustrates a device according to this invention.

The device 1 according to this invention and schematically shown on FIG. 1 is used for determining and updating, automatically, a target altitude for an emergency descent of an aircraft AC, in particular a transport airplane, said target altitude representing the altitude to be reached by the aircraft AC at the end of the emergency descent.

Figure 2:
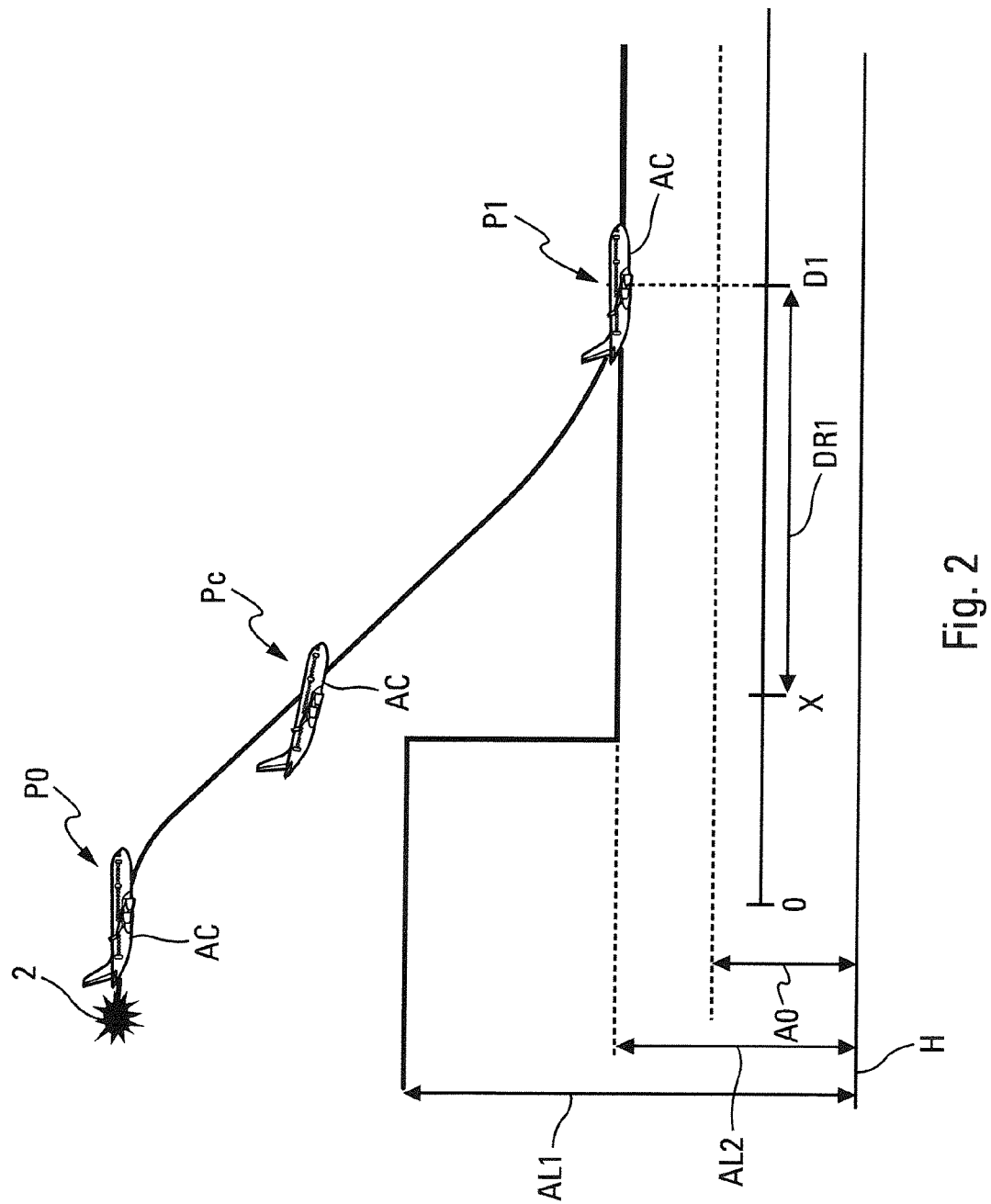
FIGS. 2 and 3 are graphics for explaining the update of a target altitude upon an emergency descent, respectively for two different embodiments.
Figure 3:
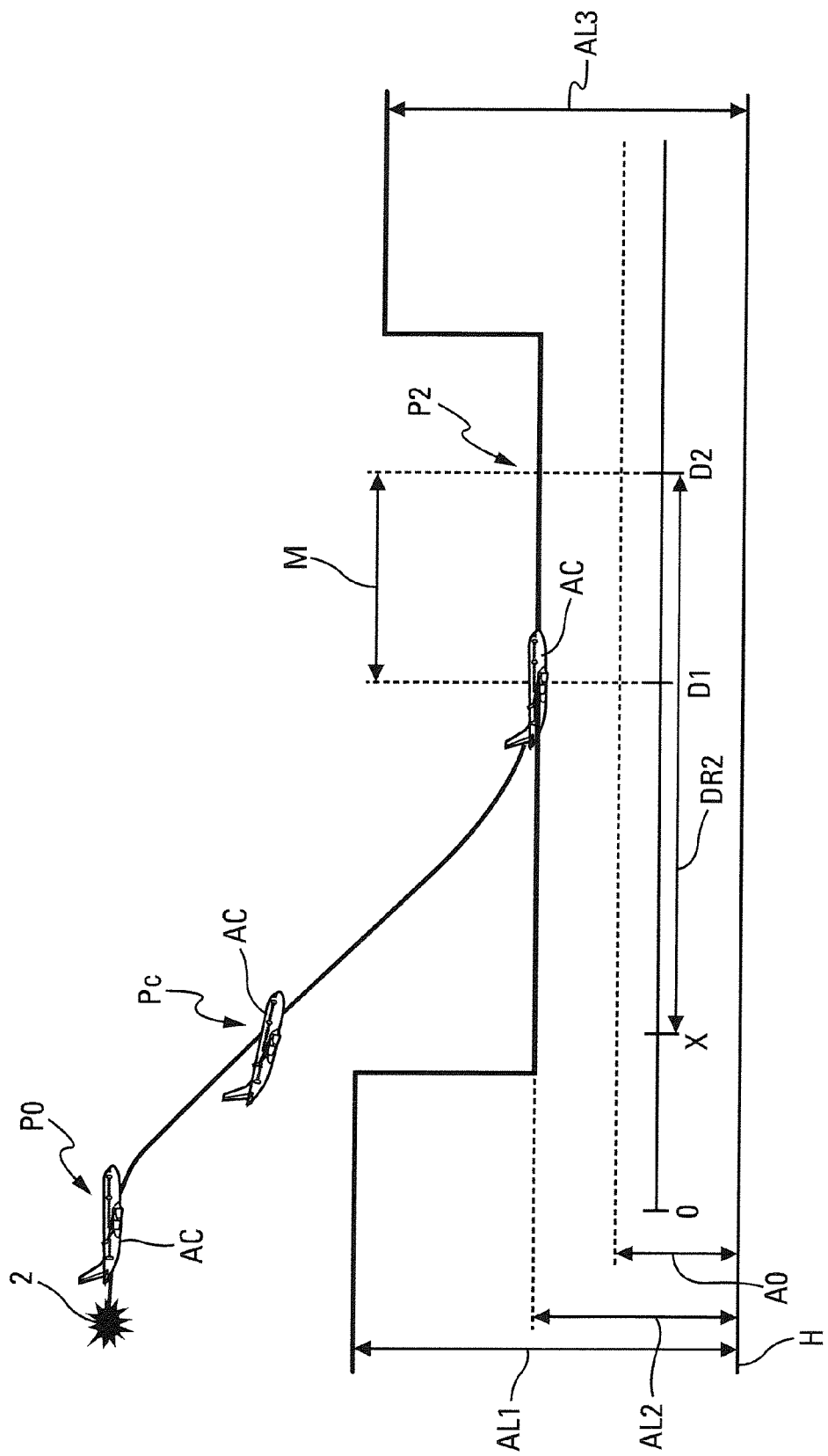

The device 1 includes elements further described herein below, being active:

- from the activation of the emergency descent (that is the initiation or the engagement of the emergency descent, according to the embodiment being contemplated), as a result of an incident, for example, depressurization, emphasized by a symbol 2 on FIGS. 2 and 3; and this
- at least on a reference horizontal distance D1, D2 ahead of the aircraft AC with respect to an initial position P0 of said aircraft AC upon the activation of the emergency descent, as shown on FIG. 2. This FIG. 2 further shows the distance X followed by the aircraft AC at a current instant, from the activation of the automated emergency descent, corresponding to a current position Pc of the aircraft AC.

According to this invention, said device comprises:

- a remaining horizontal distance determination device 3 for determining a remaining horizontal distance DR1, DR2 representing a horizontal distance that is still to be followed by the aircraft AC from its current position Pc until a position P1, P2 located at the reference horizontal distance D1, ahead of the initial position P0. Consequently, DR1=D1−X and DR2=D2−X;
- a security altitude determination device 4 for determining a security altitude ALdr being representative of the remaining horizontal distance DR, received from the remaining horizontal distance determination device 3 via a link 5. To this end, the security altitude determination device 4 is connected via a link 6 to a data base 7 containing the security altitudes AL1, AL2, etc., including of the usual MORA type. A security altitude AL1, AL2 corresponds to a maximum altitude of the relief (with respect to the level H of the sea) added with a security margin along the current flight itinerary or along the current heading ahead of the aircraft AC, and on a predetermined width on both sides of the trajectory. The security altitude determination device 4 thus determines the security altitude ALdr along the current flight itinerary or along the current heading track on the descent distance DR1, DR2 still to be followed by the aircraft AC until the position P1, P2; and
- a comparing device 8 being connected via a link 9 to the security altitude determination device 4 and being formed so as to compare this security altitude ALdr to a threshold altitude A0, for example 10,000 feet and so as to select, as the current target altitude ALPc, the highest value between the security altitude ALdr and the threshold altitude A0.

Thus, the current target altitude ALPc is determined from a defined security altitude along the current trajectory of the aircraft AC at a certain distance (remaining horizontal distance D1, D2) ahead of the aircraft AC.

The device 1 according to this invention therefore allows to take into account the relief along the current trajectory of the aircraft AC so as to avoid descending too low and causing a collision with the ground, while promoting the lowest possible descent, more particularly for allowing the occupants of the aircraft AC, should they become unconscious as a result of hypoxia, to regain conscience.

In a particular embodiment, said device 1 further comprises:

- a combination of elements including the remaining horizontal distance determination device 3, the security altitude determination device 4, and the comparing device 8, for automatically determining an initial target altitude ALP0 being representative of said initial position P0 of the aircraft AC upon said activation of the emergency descent. This initial target altitude ALP0 corresponds to a maximum value between a security altitude (representative of a horizontal distance D1, D2) and a predetermined auxiliary threshold altitude, for example 10,000 feet. This security altitude corresponds to the maximum altitude of the relief along the current flight itinerary or along the current heading on the distance D1, D2 ahead of the aircraft AC, and on a predetermined width on both sides of the trajectory; and an altitude determination device 10 being connected via a link 11 to the comparing device 8 and being formed so as:

to determine a current target altitude ALPc received from the comparing device 8, to the initial target altitude ALP0; and to update the altitude to be used upon the emergency descent taking said current target altitude ALPc, if said current target altitude ALPc is lower than said initial target altitude ALP0. The thus updated altitude can be transmitted via a link 12.

Thus, the device 1 according to this invention updates the target altitude for allowing the aircraft AC to be brought as low as possible while protecting from the relief. In particular, this allows avoiding being hindered by a localized height of the relief:

that has already been flown over upon the descent and thus corresponds to an obsolete data, for instance the altitude AL1 upstream the current position Pc; or being located very far ahead of the aircraft AC, beyond the reference horizontal distance D1, D2 and thus, to be ignored at short term.

The device 1 according to this invention thereby allows to determine an optimized target altitude on said remaining horizontal distance DR1, DR2 located ahead the aircraft AC, maximizing the possibility to return to a nominal state in the case where an unconscious crew or passengers or victims of hypoxia symptoms, without reducing the security margins with respect to the relief along the trajectory to be followed.

In a first simplified embodiment shown on FIG. 2, said reference horizontal distance corresponds to a maximum horizontal distance D1 that the aircraft AC is able to follow upon an emergency descent from the highest cruise flight level for the aircraft AC until a target altitude generally 10,000 feet (corresponding to the regulatory altitude at the end of a descent if there is no higher relief). As an example, the distance D1 followed by a medium-range aircraft with a mass of 250 tons and a 30% centring, for descending as quickly as possible from the flight level FL 400 to the flight level FL100, is 40 Nm.

Moreover, in a second embodiment represented on FIG. 3, said reference horizontal distance D2 corresponding to the sum:

of said maximum horizontal distance (D1) the aircraft (AC) is able to follow upon an emergency descent from the highest cruise flight level for the aircraft (AC); and of a predetermined margin (M).

Such a margin M allows taking into account:

the fact that the distance to be followed upon a nominal emergency descent could be extended (for instance, after a decrease of the target speed as a result of structure damage); and the possibility that the crew would still be unconscious, once reaching the position P1. Through such a margin M, an additional period of time is therefore added, being sufficient (until a position P2) for allowing the crew to recover once the aircraft AC is stabilized at a given altitude.

As an illustration, for the example represented on FIG. 3, if it is considered that:

the mean distance covered by the aircraft AC upon an emergency descent is D1=40 NM; and the margin is M=10 NM, then D2=D1+M=50 NM.

The initially calculated target altitude ALP0 in the proposed example is:

$$ALP0=\text{Max}(ALd2: A0)=ALd2=AL1$$

It corresponds to the maximum relief (AL1 is for instance equal to 15,000 feet) met on the distance D2 upon the initiation of the maneuver.

Once the distance X being covered upon the descent, the security altitude as determined by the device 1 on the distance DR still to be followed decreases and reaches:

$$ALPc=\text{Max}(ALdr: A0)=AL2=AL1$$

An update is then carried out and the new target altitude taken into account for the automated emergency descent will then be AL2, for instance 12,000 feet.

In the example of FIG. 3, the security altitude is increased up to AL3, for instance 14,000 feet, beyond the point of completion of the maneuver. Such a value is excluded from the update calculation.

The previous example allows the advantages of the present invention to be emphasized. It is readily understood that targeting, as soon as the descent is initiated, the 12,000 foot value (AL2) involves an unacceptable risk of collision with the surrounding ground, as it not possible to ensure that the trajectory being followed upon the emergency descent will not intercept the first 15,000 foot step (AL1). Once the step is exceeded, it becomes appropriate to authorize the aircraft AC to descent further to a more breathable level. Moreover, taking into account the 14,000 foot step, located beyond the stabilization point of the emergency descent (to more than 50 NM), would be a useless hindrance.

The device 1 also comprises an indicator 13 being, for instance, connected to the altitude determination device 10 via a link 14. Such an indicator 13 allows the pilots of the aircraft AC to display the target altitude calculated by the device 1 and to check the relevance thereof with respect to values of security altitude indicated on the navigation maps or on the navigation screens of the aircraft AC.

The device 1 according to this invention, such as mentioned hereinabove, for determining and updating an optimum target altitude for an emergency descent of an aircraft AC, is adapted to any emergency descent system, either partially or completely automated.

However, in a preferred application, this device 1 is used for determining and updating the target altitude in a system 15 for controlling automatically an emergency descent of an aircraft AC.

Figure 4:
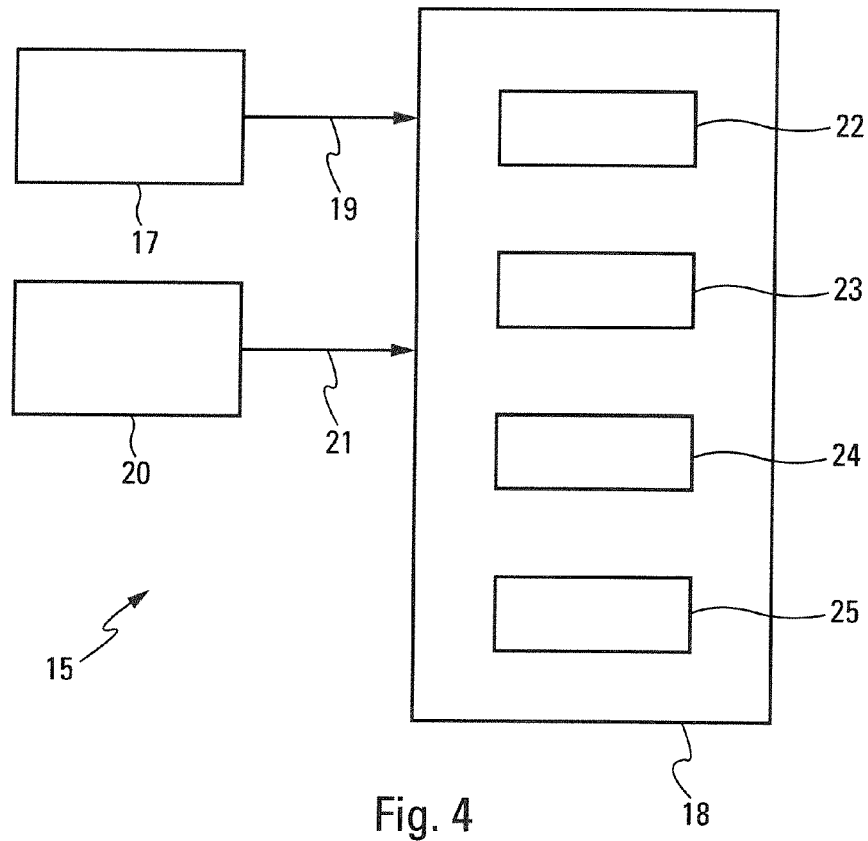
FIG. 4 is a block diagram of a system for automatically controlling an emergency descent of an aircraft, comprising a device according to this invention.

Preferably, this system 15 for automatically controlling an emergency descent, is of the type comprising, as shown on FIG. 4:

an engagement actuator 17 being able to engage an automatic function of emergency descent;

a controller 18 being connected via a link 19 to the engagement actuator 17 and being formed so as to implement an automatic function of emergency descent, when they are engaged by the engagement actuator 17, automatically implementing a longitudinal guidance, a lateral guidance and a control of the speed of the aircraft AC: and a disengagement actuator 20 being connected via a link 21 to the controller 18 and allowing to control a disengagement of an automatic function of emergency descent being carried out.

Such an automatic function of emergency descent thus allows to bring back the aircraft AC to a breathable altitude (target altitude) and in a stabilized situation, in order, more specifically, to reanimate (if needed) the crew and the passengers and to continue the flight.

The controller 18 includes:
a vertical setpoint determination device 22 for automatically determining a set of vertical setpoints, more specifically comprising:
the target altitude representing the altitude to be reached by the aircraft AC at the end of the emergency descent; and
a target speed representing the speed that the aircraft AC should respect upon the emergency descent;
a lateral setpoint determination device 23 for automatically determining a set of lateral setpoints. Such a set represents a lateral maneuver to be carried out upon the emergency descent; and
an aircraft guidance device 24 for automatically guiding the aircraft, upon the engagement of an automatic function of emergency descent, so that it simultaneously respects the set of vertical setpoints and the set of lateral setpoints, and this, until the target altitude is reached, such a target altitude that it maintains as soon as it is reached.

Such a system 15 for automatically controlling an emergency descent could, more specifically, be similar to the system described in document FR-2,928,465 of the Applicant.

In this case, the vertical setpoint determination device 22 includes the device 1 for determining and updating the target altitude.

Such a system 15 could, furthermore, have more specifically the following characteristics:
two types of initiation could be contemplated: a voluntary initiation and an automatic initiation.
When the crew decides to carry out an emergency descent as a result of a depressurization, a fire alarm or any other reason, they have the possibility to initiate the function actuating a dedicated press-button. A logic allows to validate such an initiation condition as a function, more specifically, of the current altitude of the aircraft AC.
The automatic initiation is associated with a depressurization event. It occurs when some criteria involving the pressure of the air or the variation of the pressure of the air inside the cockpit are met.
The initiation of the function always precedes the engagement thereof;
the crew keeps at all time the possibility to manually de-initiating the function, whatever the initiation (voluntary or automatic) type;
two types of engagement are possible as a function of the initiation type that has preceded.
As a result of a voluntary initiation, the engagement only occurs when the air brakes are completely implemented by the crew.
On the other hand, if the initiation has been automatic, the engagement, in turn, occurs automatically at the end of a countdown initiated at the initiation operation, if the crew has not reacted before the end thereof. However, if via a procedure, the crew completely implements the air brakes before the end of the count-down, the engagement of the function is anticipated with respect to the automatic engagement;
when the automatic function of emergency descent is engaged, the guidance and the control of the speed of the aircraft are carried out in vertical and lateral planes as follows:
in the vertical plane, the speed adopted for carrying out the automatic emergency descent is selected by default through the automatic operation, so as to minimize the descent time. The crew could freely adjust such a speed upon the descent maneuver, in order to take into account possible structure damage, and this, without disengaging the function;
lateral maneuver, carried out simultaneously with the longitudinal maneuver, aims at deviating the aircraft AC from the current itinerary so as to avoid meeting other aircrafts flying on the same itinerary, but at lower altitudes;
going out from the automatic emergency descent coincides with the capture, then maintaining the target altitude upon the maneuver; and
upon the automated emergency descent maneuver, the crew can at all time take over from the automatic functioning through usual means: manual action on the joystick, engagement of a new guidance mode of the aircraft AC, disconnection button, adjustment of the speed or of the heading, etc.

Furthermore, the system 15 for automatically controlling an emergency descent, further includes an aircraft altitude control device 25 for automatically controlling the aircraft AC, when it reaches the target altitude, so that it follows the ground, at an auxiliary altitude, and this, as long as the crew have not regained conscience. Preferably, this auxiliary altitude corresponds to the maximum value between a security altitude (being representative of a horizontal distance D3) and a predetermined auxiliary threshold altitude, for example, 10,000 feet.

Thus, when the aircraft AC is stabilized at an altitude given value, after having carried out an automated emergency descent, the system 15 provides carrying out a scan of the security altitudes along the current flight itinerary or a current heading on a distance D3 ahead of the aircraft AC and on a predetermined width on both sides of this same trajectory, and adjusting the aircraft AC for a descent or a climbing operation of the aircraft AC.

The distance D3 could be fixed to a basic value (for instance 40 NM) or, in a particular embodiment be chosen so as to ensure the ability of the aircraft AC to climb so as to fly over the highest relief, starting from the level of the ground FL100.

If the example shown on FIG. 3 is continued, the security altitude increases to the value AL3 (for instance 14,000 feet) along the trajectory after the aircraft AC has become stabilized. Once this step is exceeded (at a distance D3 before the step), the system 15 automatically controls a climbing operation for the aircraft AC for reaching this new security altitude AL3 allowing to avoid the collision with the relief. Such a ground tracking principle continues until the crew has regained conscience.

Furthermore, the system 15 further includes elements (not shown) for carrying out a resetting of the target altitude so as to take into account variations of barometric pressure occurring upon the emergency descent. To this end, such elements include:
a device for determining a security target altitude as a function of the emergency descent;
a device for determining a corrective value taking into account variations of the barometric pressure occurring upon the emergency descent; and
a device for calculating the sum of said security target altitude and of said corrective value for obtaining a reset target altitude being able to replace a target altitude to be reached at the end of the emergency descent.

In a first embodiment, for determining said corrective value:
the lowest atmospheric pressure and the highest atmospheric pressure are taken into account, as met on this day;

first and second differences are determined between a barometric reference and, respectively, said lowest atmospheric pressure and said highest atmospheric pressure; and the highest difference is converted into an absolute value, between these first and second differences, into a height value representing said corrective value.

Moreover, in a second embodiment, for determining said correction value, the following operations are automatically and repeatedly carried out:

the current barometric altitude of the aircraft is determined;

the current height of the aircraft is determined with respect to the sea level using elements other than barometric measurement devices means; and said current height at said current barometric altitude is subtracted so as to obtain said corrective value.

The invention claimed is:

1. A method for determining a target altitude and for controlling an emergency descent of an aircraft, the target altitude representing the altitude to be reached by the aircraft at the end of the emergency descent, the method comprising:

automatically and repeatedly performing the following operations upon activation of the emergency descent, and with respect to a reference horizontal distance located ahead of the aircraft relative to an initial position thereof when the emergency descent is activated, the reference horizontal distance corresponding to at least a maximum horizontal distance that the aircraft is able to follow upon an emergency descent from the highest cruise flight level for the aircraft:

(a) determining a remaining horizontal distance which represents a horizontal distance that is still to be followed by the aircraft from the current position thereof to a position located at the reference horizontal distance ahead of the initial position, (b) determining a security altitude for the remaining horizontal distance, the security altitude corresponding to a maximum altitude of relief along the trajectory of the aircraft for the remaining horizontal distance and on a predetermined width on both sides of the trajectory, (c) comparing the security altitude to a threshold altitude, and (d) selecting as the target altitude the higher of the security altitude and the threshold altitude, and implementing the emergency descent using at least one of the target altitudes selected as a result of performance of operations (a) through (d), wherein the automatic and repeated performance of operations (a) through (d) causes the target altitude to be updated in real time and allows the aircraft to be brought as low as possible while still protecting the aircraft from the relief, but at the same time allows for avoiding being hindered by a localized height of the relief that has already been flown over by the aircraft, wherein implementing the emergency descent further comprises:

automatically determining a set of vertical setpoints based on the target altitude selected during operations (a) through (d) and a target speed representing a speed that the aircraft should maintain upon the emergency descent;

automatically determining a set of lateral setpoints representing a lateral maneuver to be carried out upon the emergency descent; and automatically guiding the aircraft so that the aircraft simultaneously respects the set of vertical setpoints and the set of lateral setpoints until reaching the target altitude, and wherein the aircraft travels along an initial flight itinerary before initiating the emergency descent, and wherein the reference horizontal distance is set along the initial flight itinerary such that the aircraft continues to travel along the initial flight itinerary while determining the target altitude and while conducting the emergency descent.

2. The method according to claim 1, further comprising:

using operations (a) through (d) to automatically determine an initial target altitude representative of the initial position of the aircraft upon activation of the emergency descent, and thereafter automatically and repeatedly carrying out the following operations on the reference horizontal distance, using operations (a) through (d) to determine a current target altitude which corresponds to a current position of the aircraft, comparing the current target altitude to the initial target altitude, and if the current target altitude is lower than the initial target altitude, using the current target altitude during the implementation of the emergency descent, thereby to update the target altitude used by the aircraft during the emergency descent.

3. The method according to claim 1, wherein the reference horizontal distance is equal to the maximum horizontal distance that the aircraft is able to follow upon an emergency descent from the highest cruise flight level for the aircraft.

4. The method according to claim 1, wherein the reference horizontal distance is equal to the sum of: the maximum horizontal distance the aircraft is able to follow upon an emergency descent from the highest cruise flight level for the aircraft; and a predetermined margin.

5. The method according to claim 1, wherein when the aircraft reaches the target altitude and the crew of the aircraft have previously lost consciousness and have still not yet regained consciousness, the process further comprises:

automatically controlling the aircraft so that the aircraft follows the ground, at an auxiliary altitude, thereby to give the crew the longest possible time to regain consciousness.

6. The method according to claim 5, wherein the auxiliary altitude corresponds to the maximum value between a security altitude for an auxiliary distance ahead of the aircraft and the threshold altitude.

7. The method according to claim 1, further comprising:

resetting the target altitude, so as to take into account variations of barometric pressure occurring upon the emergency descent.

8. An apparatus for automatically determining a target altitude and for controlling an emergency descent of an aircraft, said target altitude representing the altitude to be reached by the aircraft at the end of the emergency descent, the apparatus comprising:

a remaining horizontal distance determination device for automatically and repeatedly determining a remaining horizontal distance representing a horizontal distance that is still to be followed by the aircraft from a current position of the aircraft to a position located at a reference horizontal distance ahead of an initial position of the aircraft, the reference horizontal distance corresponding to at least a maximum horizontal distance that the aircraft is able to follow upon an emergency descent from the highest cruise flight level for the aircraft;

a security altitude determination device for automatically and repeatedly determining a security altitude for the remaining horizontal distance corresponding to a maximum altitude of relief along the trajectory of the aircraft for the remaining horizontal distance and on a predetermined width on both sides of the trajectory;

a comparing device for automatically and repeatedly comparing the security altitude to a threshold altitude;

a target altitude determination device for automatically and repeatedly selecting, as the target altitude, the higher of the security altitude and the threshold altitude;

an implementation device for implementing the emergency descent using at least one of the target altitudes selected by the target altitude determination device;

a vertical setpoint determination device for automatically determining a set of vertical setpoints based on at least one target altitude selected by the target altitude determination device; and a target speed representing a speed that the aircraft should maintain upon the emergency descent;

a lateral setpoint determination device for automatically determining a set of lateral setpoints, representing a lateral maneuver to be carried out upon the emergency descent; and an aircraft guidance device for automatically guiding the aircraft so that it simultaneously respects the set of vertical setpoints and the set of lateral setpoints until reaching the target altitude, whereby the automatic and repeated operation of the devices causes the target altitude to be updated in real time and allows the aircraft to be brought as low as possible while still protecting the aircraft from the relief, but at the same time allows for avoiding being hindered by a localized height of the relief that has already been flown over by the aircraft, and wherein the aircraft travels along an initial flight itinerary before initiating the emergency descent, and wherein the reference horizontal distance is set along the initial flight itinerary such that the aircraft continues to travel along the initial flight itinerary while determining the target altitude and while conducting the emergency descent.

9. A method for determining a target altitude and for controlling an emergency descent of an aircraft, the target altitude representing the altitude to be reached by the aircraft at the end of the emergency descent, the aircraft travelling along an initial flight itinerary before initiating the emergency descent, the method comprising:

automatically and repeatedly performing the following operations upon activation of the emergency descent, and with respect to a reference horizontal distance located ahead of the aircraft relative to an initial position thereof when the emergency descent is activated, the reference horizontal distance corresponding to at least a maximum horizontal distance that the aircraft is able to follow upon an emergency descent from the highest cruise flight level for the aircraft:

(a) determining a remaining horizontal distance which represents a horizontal distance that is still to be followed by the aircraft from the current position thereof to a position located at the reference horizontal distance ahead of the initial position, (b) determining a security altitude for the remaining horizontal distance, the security altitude corresponding to a maximum altitude of relief along the trajectory of the aircraft for the remaining horizontal distance and on a predetermined width on both sides of the trajectory, (c) comparing the security altitude to a threshold altitude, and (d) selecting as the target altitude the higher of the security altitude and the threshold altitude, implementing the emergency descent using at least one of the target altitudes selected as a result of performance of operations (a) through (d);

using operations (a) through (d) to automatically determine an initial target altitude representative of the initial position of the aircraft upon activation of the emergency descent, and thereafter automatically and repeatedly carrying out the following operations on the reference horizontal distance, using operations (a) through (d) to determine a current target altitude which corresponds to a current position of the aircraft, comparing the current target altitude to the initial target altitude, and if the current target altitude is lower than the initial target altitude, using the current target altitude during the implementation of the emergency descent, thereby to update the target altitude used by the aircraft during the emergency descent, wherein the automatic and repeated performance of operations (a)-(d) causes the target altitude to be updated in real time and allows the aircraft to be brought as low as possible while still protecting the aircraft from the relief, but at the same time allows for avoiding being hindered by a localized height of the relief that has already been flown over by the aircraft, and wherein the reference horizontal distance is set along the initial flight itinerary such that the aircraft continues to travel along the initial flight itinerary while determining the target altitude and while conducting the emergency descent.

10. A method comprising:

installing on an aircraft the apparatus of claim 8, for subsequent use thereof during an emergency descent of the aircraft.

11. An aircraft resulting from a method, the method including installing on an aircraft equipment suitable for performing the method of claim 1, for subsequent implementation thereof during an emergency descent of the aircraft.

* * * * *